United States Patent [19]

Lück

[11] 4,062,495
[45] Dec. 13, 1977

[54] GAS SUPPLY DEVICE FOR FLAME SCARFING
[75] Inventor: Ewald Lück, Bonefeld, Germany
[73] Assignee: GeGa Gesellschaft fur Gasetechnik Lotz KG, Germany
[21] Appl. No.: 662,102
[22] Filed: Feb. 27, 1976
[30] Foreign Application Priority Data
Feb. 28, 1975 Germany .............................. 2508681
[51] Int. Cl.² ............................................... B05B 1/14
[52] U.S. Cl. ....................................... 239/559; 266/53; 277/110; 239/DIG. 4
[58] Field of Search ............................ 266/51, 52, 53; 239/559, 556; 251/DIG. 1; 277/59, 110; 239/DIG. 4

[56] References Cited
U.S. PATENT DOCUMENTS 2,661,182  12/1953  Kipp ............................ 251/DIG. 1
2,838,431  6/1958   Allmang et al. .................. 266/53 X
3,612,479  10/1971  Smith, Jr. ...................... 251/DIG. 1

FOREIGN PATENT DOCUMENTS 616,199  7/1954  Canada .......................... 251/DIG. 1

Primary Examiner—Evon C. Blunk
Assistant Examiner—Michael Mar
Attorney, Agent, or Firm—Gifford, Chandler, Sheridan & Sprinkle

[57] ABSTRACT

A burner for use in a flame scarfing apparatus including a plurality of flame scarfing sections, a transverse bore extending through the burner, a screw-threaded bolt disposed within the bore, chamber sleeves disposed about the bolt and spaced to correspond to approximately the length of the flame scarfing sections and O-rings mounted in annular grooves formed intermediate the sleeves so that tightening nuts on the bolt compresses the O-rings into sealing engagement against the surface forming the transverse bore.

8 Claims, 2 Drawing Figures

GAS SUPPLY DEVICE FOR FLAME SCARFING

FIELD OF THE INVENTION

The invention relates to a gas supply device for flame scarfing of billets, ingots and slabs, which is provided with gas supply ducts, for example for heating oxygen, heating gas and flame scarfing oxygen to extend to the flame scarfing burners and a transverse bore extending through the burner is subdivided by means of bolts with annular grooves in which O-rings are located to form limited flame scarfing sections which do not extend beyond the maximum possible flame scarfing width.

DESCRIPTION OF THE PRIOR ART

In flame scarfing or oxygen gouging of billets, ingots and slabs, the workpiece edge is raised to ignition temperature with the heating flame of the flame scarfing burner which is provided with such gas supply devices. So-called "flame scarfing oxygen" is thereafter additionally blown through the flame scarfing burner to burn the material that has been raised to ignition temperature and by virtue of its kinetic energy drives the resultant iron oxide slag before it is the flame scarfing apparatus or the flame scarfing machine or the workpiece move relative to each other.

The heating oxygen and heating gas, for example propane or natural gas, as well as flame scarfing oxygen are supplied to the flame scarfing burners or to the flame scarfing burner through pressure regulators, ducts, adjustable valves and hose ducts. Since more than one flame scarfing burner must often be supplied, the system is divided so that each burner on such a machine is independently supplied with gas and oxygen but can also be shut down by means of valves or solenoid valves. The so-called flame scarfing width of a flame scarfing machine can thus be adapted to the width of the workpiece that is being processed.

A shape for a flame scarfing burner has been developed which, although still comprising individual burners of the greatest possible width, acts in the manner of a large wide flame scarfing burner as regards the gas and oxygen flow, to act beyond the maximum flame scarfing width of the machine. This is an advantage over burners of the prior art since the use of a plurality of adjacently arranged self-contained burners often resulted in undesirable scores or grooves on the workpiece corresponding to the appropriate flame scarfing width of a burner. In some circumstances the individual burners are even now subdivided more finely into flame scarfing sections of the orders of magnitude of 25 mm to 100 mm and are switched on or shut down by means of valves or solenoid valves. However, there is now no space to construct a pipeline supply system which is designed for each individual segment. Instead, a compact valve is produced for switching on and shutting down the supply of oxygen and gas in sections.

The media flow via a manifold bridge through the device for switching on and shutting off, then into the so-called burner plates, each having a supply port for heating gas or heating oxygen for each segment. The entry port for each segment extends into a bore which extends transversely through the entire nozzle plate from which a large number of small heating ports extend to atmosphere. Since each individual feed in the plate corresponds to a section which can be switched on and shut down it is necessary for the transverse bore in the burner plate front to be correspondingly subdivided. This is achieved in conventional manner by providing a bolt with annular grooves, O-rings being fitted on the bolts into the annular grooves which are spaced from each other at the distance of a flame scarfing section and the entire O-ring bolt assembly is then inserted into the transverse bore or transverse bores in the front part of the burner and fixed from the outside by screw-mounting.

This construction functions in principle but suffers from substantial disadvantages because installation and maintenance can be performed only with relative difficulty and require a substantial expenditure in terms of time and cost: to begin with, the annular grooves on the bolt and the O-rings must be so dimensioned and fitted that the entire sealing assembly can be inserted into the transverse bore. It is therefore necessary to make concessions regarding the reliability of sealing and this in turn sometimes leads to leakages between the individual sections so that sections which are intended to provide a full burning performance do not burn well because of a gas loss while adjacent burning sections which are shut down continue to burn or cause gas loss. Secondly, it is possible for the O-rings to become squeezed, distorted or even forced from their seats when the sealing structure is inserted, more particularly if the external O-ring diameter in its prestressed state occupies a relatively large overall external diameter in the interests of providing proper sealing. This results in destruction of the seals and calls for dismantling and repair of the bolt construction and reassembly. This means that the work already required for the normal insertion of the seal structure becomes very time-consuming because it must be performed with great skill and care and, if the O-rings are damaged, which happens very frequently, the entire installation procedure must be repeated with the same expenditure in terms of time and the time required for any necessary dismantling procedure must also be added.

The situation becomes even more serious if an unsuccessful installation of the seal structure is detected only when the flame scarfing machine is set into operation. This will then also call for shutting down of the flame scarfing machine, dismantling of the imperfect burner plates and reassembling of the perfect burner plates, features which may lead to very substantial interference with the production flow and therefore, to substantial production losses.

SUMMARY OF THE PRESENT INVENTION

It is therefore the object of the invention to make available an improved gas supply device which avoids the disadvantages explained above the permits installation in a shorter length of time without difficulties, even by less skilled and trained expert personnel.

According to the invention, in a gas supply device of the kind described hereinbefore, the bolt is constructed as a screwthreaded bolt with chamber sleeves slid thereupon. The length of each sleeve which corresponds approximately to the length of the desired flame scarfing sections and O-rings, loosely inserted in adjustable annular grooves between the sleeves prior to installation, are placed into an outwardly pressed state after insertion of the bolt system into the transverse bore by the tightening of nuts on the screwthreaded bolt end which reduces the annular grooves.

In a further embodiment of the invention, the bolt comprises two screwthreaded bolts with screw heads and at least one chamber sleeve is provided with internal screwthreading and the remaining chamber sleeves with the O-rings are screw-mounted upon the screwthreaded bolts.

The invention will now be explained by reference to the annexed exemplified embodiments.

DETAILED DESCRIPTION OF THE PRESENT INVENTION

Figure 1:
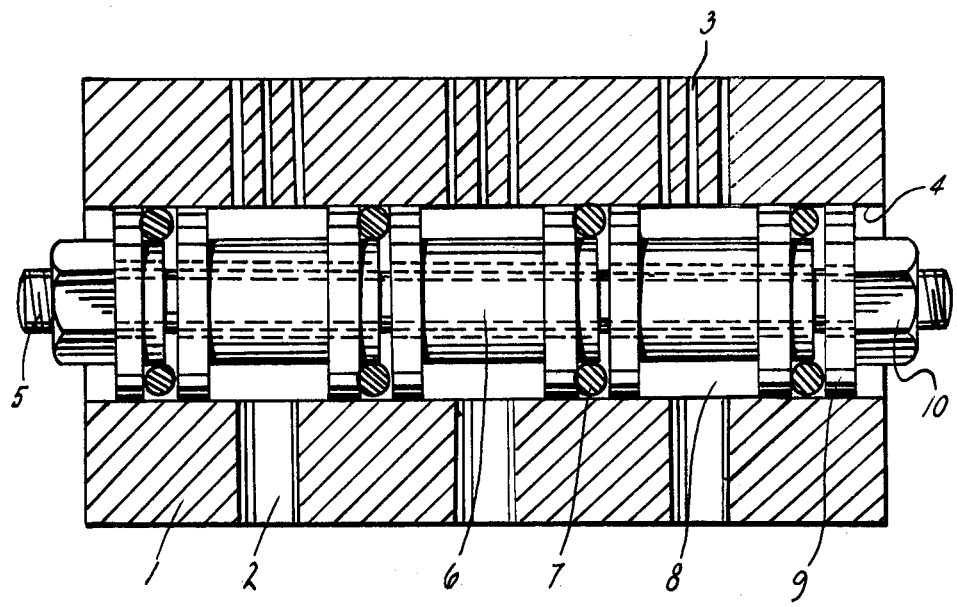
FIG. 1 shows a gas supply device with the novel bolt system in sectional form and FIG. 2 is a modified embodiment of the bolt system.

As shown in FIG. 1, the chamber bolt which is inserted into the housing 1 of a burner plate, namely into the transverse bores 4 situated between the supply ports 2 and the exit ports 3, comprises a screwthreaded bolt 5 with chamber sleeves 6 slid thereover and having O-rings 7 inserted on the bolt 5 between the sleeves 6. A medium which is supplied from a supply port 2 can therefore pass only in the section defined by the O-rings 7 through the annular chamber formed by the transverse bore 4 and the core diameter of a chamber sleeve 6 to the exit ports 3.

The bolt 5 is inserted into the transverse bore 4 and aligned in a lightly prestressed state because the O-rings 7 are held in position only under light pressure without deformation. Further tightening of the nuts 10 on the screw-threaded bolt 5 causes the O-rings 7 to be compressed between enlarged portions 9 of the sleeves 6 so that they are expanded and thus bear sealingly and lockingly on the wall of the transverse bore.

Figure 2:
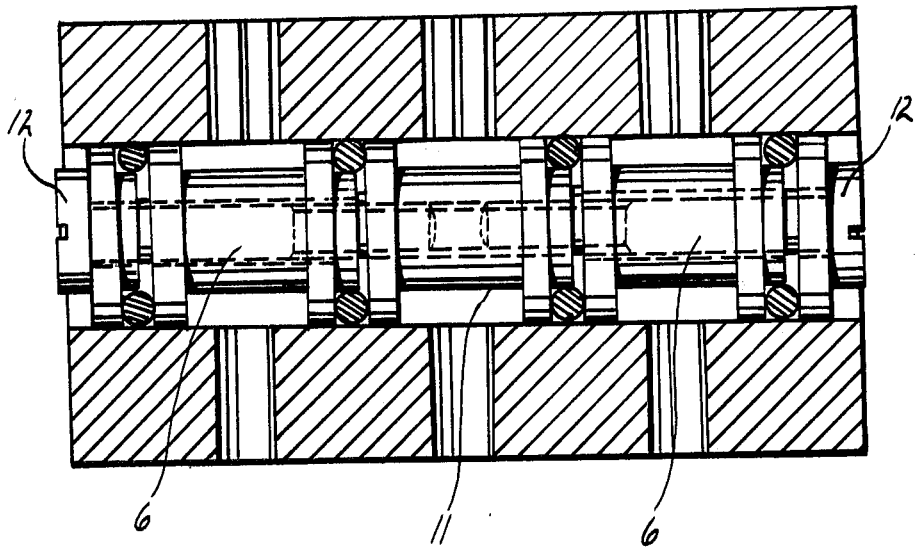

As best seen in FIG. 2, a chamber sleeve 11 with internal screwthreading and two screws 12 can also be used in place of a screwthreaded bolt 5 with two nuts 10 to enable the chamber sleeve 11 and chamber sleeves 6 to be clamped together at its installation site.

Having thus described several modifications of my invention: I claim:

1. A gas supply device comprising a housing having a first bore therethrough and a plurality of spaced inlet and exit bores intersecting said first bore, an elongated member axially slidably disposed in said first bore, said elongated member further comprising at least two sleeves and an elongated rod member disposed axially through a portion of at least two sleeves, a plurality of compressible seal members disposed around said rod member and between said sleeves, said seal members loosely engaging the surface forming said first bore and being positioned to separate at least one of said inlet bores from other inlet bores and to separate at least one of said exit bores from other exit bores, and means accessible from the exterior of said housing for threadably engaging said rod member whereby rotation of said meand draws said sleeves axially toward each other to thereby selectively compress said seal members radially outwardly into fluid-tight engagement with the surface defining said first bore.

2. The device as defined in claim 1 and in which said seal members are O-rings.

3. The device as defined in claim 1 and in which said sleeves are of a diameter smaller than the diameter of said through bore and the sleeves in combination with the seal members being spaced apart by said sleeves define a plurality of fluidly separated fluid passages each connecting one of said inlet ports with at least one of said exit ports.

4. The invention as defined in claim 1 and in which said elongated rod member is provided with external threads on at least one end thereof and said means for drawing said sleeves together comprises a nut movable along said threads into engagement with one of said sleeves.

5. The invention as defined in claim 1 and in which said elongated rod member is provided with external threads on both ends thereof and said means for drawing said sleeves together comprises nut members each movable along said threads respectively into engagement with one of said sleeves.

6. The invention as defined in claim 1 and in which said elongated rod member is provided with internal threads on at least one end thereof and said means for drawing said sleeves together comprises a screw movable on said threads into the end of said elongated rod member, said screw having a head engaging one of said sleeves.

7. The invention as defined in claim 1 and in which said elongated rod members is provided with internal threads on each end thereof and said means for drawing said sleeves together comprises screws movable on said threads into the ends of said elongated rod member, said screws each having a head portion respectively engaging one of said sleeves.

8. A gas supply device comprising a housing having a first bore therethrough and a plurality of spaced inlet and exit bores intersecting said first bore, an elongated member disposed in said first bore and having a plurality of compressible seal members disposed thereon loosely engaging the surface forming said first bore, said seal members being positioned to separate at least one of said inlet bores from other inlet bores and to separate at least one of said exit bores from other exit bores, and means accessible from the exterior of said housing to selectively compress said seal members into fluid-tight engagement with the surface defining said first bore wherein said last mentioned means comprises a plurality of sleeves disposed on said elongated member between said seal members and means disposed exteriorly of said housing for drawing said sleeves together on said elongated member to thereby compress said seal members and wherein said elongated member is provided with external threads on both ends thereof and said means for drawing said sleeves together comprises nut members each movable along said threads respectively into engagement with one of said sleeves.

* * * * *

UNITED STATES PATENT AND TRADEMARK OFFICE
CERTIFICATE OF CORRECTION

PATENT NO. : 4,062,495
DATED : December 13, 1977
INVENTOR(S) : Ewald Luck

It is certified that error appears in the above-identified patent and that said Letters Patent are hereby corrected as shown below:

Col. 1, line 24, delete "is", insert --if--;

Col. 1, line 51, delete "orders", insert --order--.

Col. 2, line 52, delete "the" (second occurrence), insert --and--;

Col. 2, line 58, delete "which";

Col. 2, line 60, delete "and", insert --,--;

Col. 3, line 55, delete "meand", insert --means--.

Col. 4, line 27, after "head", insert --portion--;

Col. 4, line 30, delete "members", insert --member--.

Signed and Sealed this

Ninth Day of May 1978

[SEAL]

Attest:

RUTH C. MASON
Attesting Officer

LUTRELLE F. PARKER
Acting Commissioner of Patents and Trademarks